United States Patent
Knowles

(10) Patent No.: US 11,372,791 B2
(45) Date of Patent: Jun. 28, 2022

(54) EMBEDDING RINGS ON A TOROID COMPUTER NETWORK

(71) Applicant: Graphcore Limited, Bristol (GB)

(72) Inventor: Simon Knowles, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 30 days.

(21) Appl. No.: 16/831,630

(22) Filed: Mar. 26, 2020

(65) Prior Publication Data
US 2020/0293478 A1 Sep. 17, 2020

(30) Foreign Application Priority Data
Mar. 27, 2019 (GB) .................................. 1904267

(51) Int. Cl.
| G06F 13/40 | (2006.01) |
| G06F 15/80 | (2006.01) |
| G06N 3/04 | (2006.01) |
| G06N 3/08 | (2006.01) |

(Continued)

(52) U.S. Cl.
CPC .... *G06F 13/4027* (2013.01); *G06F 15/17325* (2013.01); *G06F 15/8015* (2013.01); *G06N 3/04* (2013.01); *G06N 3/063* (2013.01); *G06N 3/08* (2013.01)

(58) Field of Classification Search
CPC .......... G06F 13/4027; G06F 15/17325; G06F 15/8015; G06N 3/04; G06N 3/063; G06N 3/08
See application file for complete search history.

(56) References Cited

U.S. PATENT DOCUMENTS

| 2009/0307467 A1 | 12/2009 | Faraj |
| 2014/0119728 A1* | 5/2014 | Zhang ................ H04J 14/0212 398/48 |

(Continued)

OTHER PUBLICATIONS

Christoph Lenzen, "Another Supercomputer Architecture?", Jul. 1. arxiv. org, Cornell University Library, Ithaca, NY (Year: 2016).*

(Continued)

*Primary Examiner* — Henry Tsai
*Assistant Examiner* — John B Roche
(74) *Attorney, Agent, or Firm* — Haynes and Boone, LLP

(57) ABSTRACT

A computer comprising a plurality of interconnected processing nodes arranged in a configuration with multiple layers, arranged along an axis, comprising first and second endmost layers and at least one intermediate layer between the first and second endmost layers is provided. Each layer comprises a plurality of processing nodes connected in a ring by an intralayer respective set of links between each pair of neighbouring processing nodes, the links adapted to operate simultaneously. Nodes in each layer are connected to respective corresponding nodes in each adjacent layer by an interlayer link. Each processing node in the first endmost layer is connected to a corresponding node in the second endmost layer. Data is transmitted around a plurality of embedded one-dimensional logical rings with an asymmetric bandwidth utilisation, each logical ring using all processing nodes of the computer in such a manner that the plurality of embedded one-dimensional logical rings operate simultaneously.

19 Claims, 11 Drawing Sheets

(51) Int. Cl.
   *G06F 15/173*    (2006.01)
   *G06N 3/063*     (2006.01)

(56) References Cited

U.S. PATENT DOCUMENTS

2014/0328208  A1*  11/2014  Norige ................... H04L 41/12
                                                  370/254
2015/0334867  A1*  11/2015  Faw ..................... G02B 6/4452
                                                  211/126.1
2018/0240039  A1    8/2018  McLaren
2019/0045003  A1*   2/2019  Archer ................ H04L 12/4625

OTHER PUBLICATIONS

Search Report and Written Opinion dated Jul. 3, 2020 for Patent Application No. PCT/EP2020/058625, 17 pages.
Christoph Lenzen, Another Supercomputer Architecture, arxiv. org, Cornell University Library, Ithaca, NY, Jul. 1, 2016.

* cited by examiner

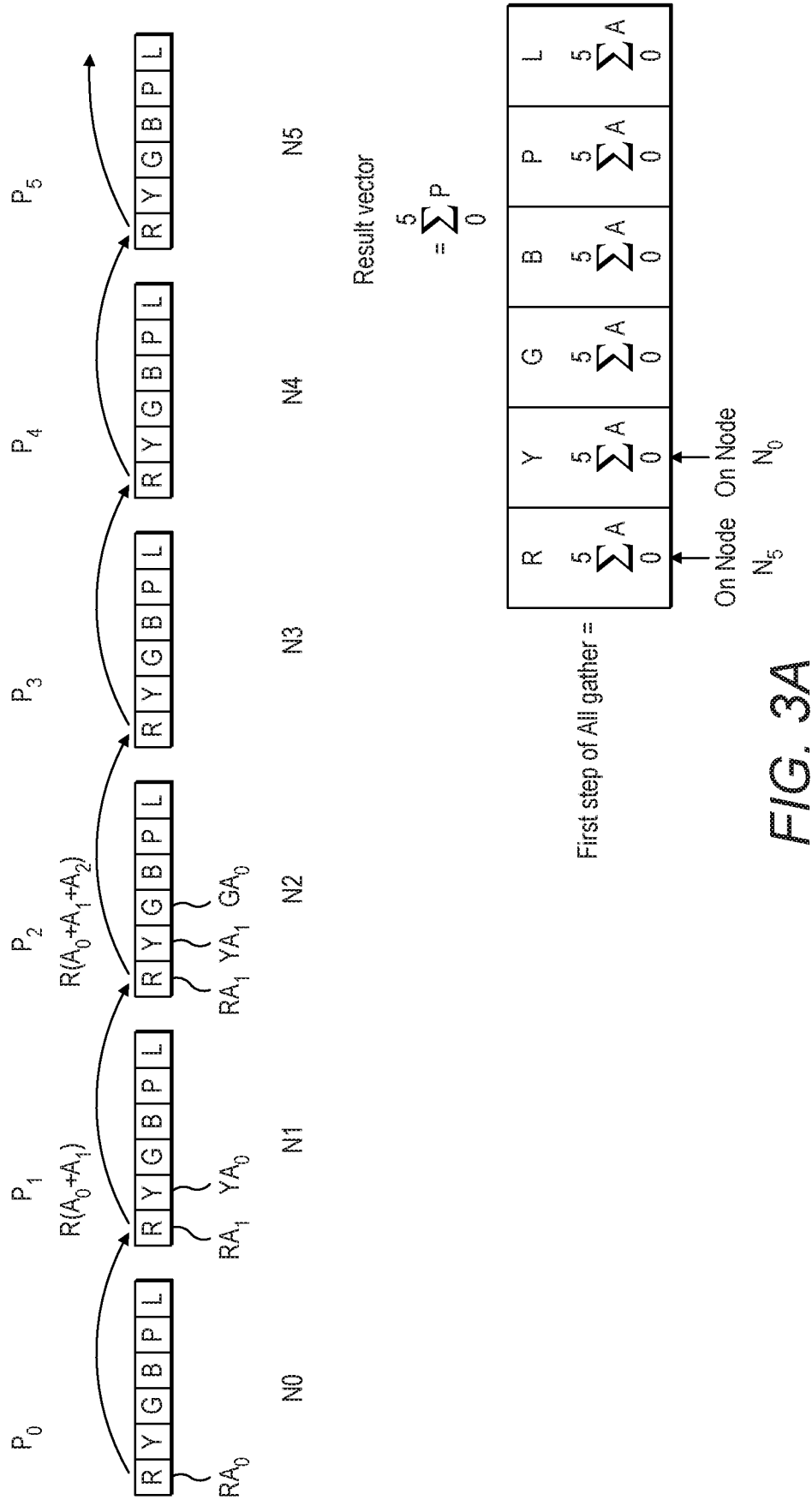

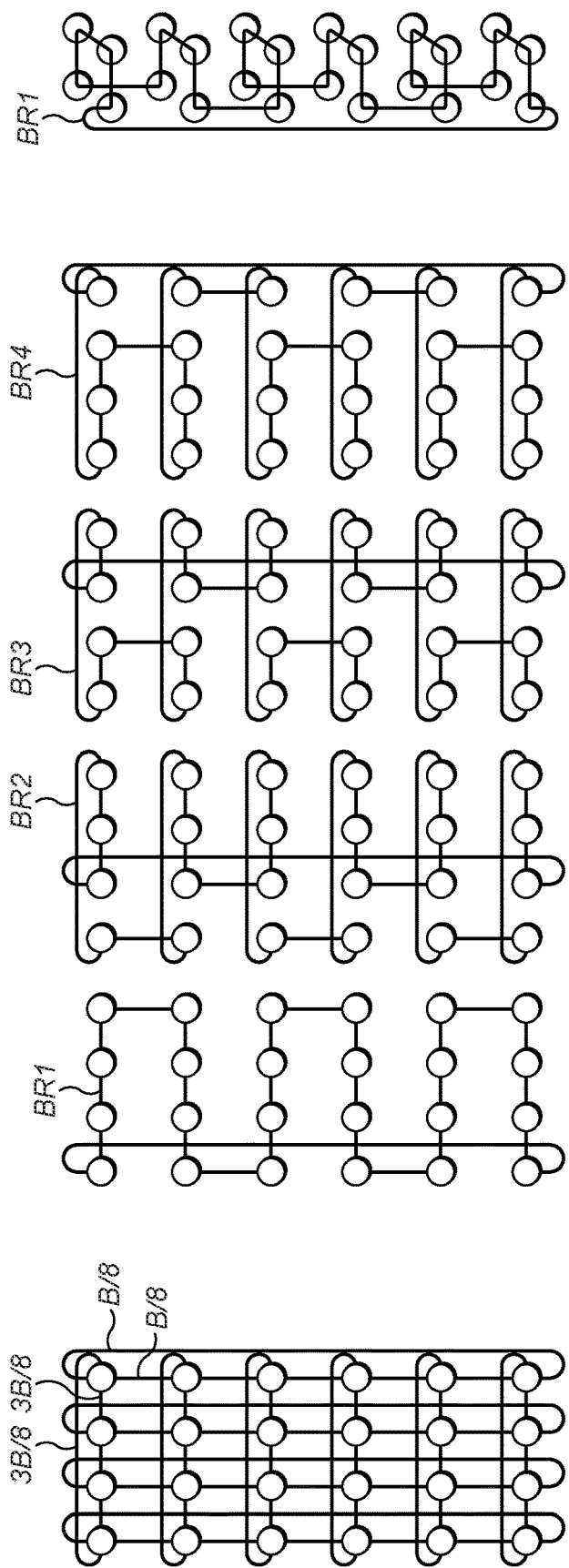

EMBEDDING RINGS ON A TOROID COMPUTER NETWORK

CROSS-REFERENCE TO RELATED APPLICATION

The present application claims priority to United Kingdom Patent Application No. 1904267.0, filed on Mar. 27, 2019, which is hereby incorporated by reference in its entirety.

FIELD

The present disclosure relates to the exchange of data between processing nodes connected in a computer particularly but not exclusively for optimising data exchange in machine learning/artificial intelligence applications.

BACKGROUND

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. Two such collective are termed "Reduce" and "Allreduce". A Reduce operation enables a result of a compute function acting on multiple data values from different source processes to be provided at a single receiving process. Note that a receiving process may be one of the source processes, and that there may be multiple receiving processes. The Allreduce collective reduces the data values from multiple source processes and distributes the results to all the source processes, (which are acting as receiving processes for the reduced result). According to the MPI Standard, the Allreduce collective may be implemented by reducing the data values from all source processes in a reduce collective (e.g. at one of the processes) and then broadcasting the result to each source process.

FIG. 1 is a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing units 110a, 110b, 110c etc. Only three units are shown in FIG. 1, but it will readily be appreciated that any number of processing units could be utilised. Each processing unit 110a, b, c receives batches of training data from the training data source 100. Each processing unit 110a, b, c holds a set of parameters 112a, 112b, 112c which define the model. An incoming batch of training data is processed with a current set of parameters in a calculation function 114a, 114b, 114c and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The weights are labelled 112a, b, c and the delta weights are labelled 116a, b, c in FIG. 1. It will be appreciated that in practice the weights and delta weights are stored in suitable stores accessible by the processing unit. If the weights and delta weights can be held in local memory, this renders the training process much more efficient.

The aim with the architecture of FIG. 1 is not to train three separate models but to train a single model in a distributed manner. Therefore, the purpose is to have the model parameters (or weights) converged to a single common set in each processing unit. It is evident that starting from any particular set of weights, and assuming that the batch of training data received at each processing unit is not identical, then there will be a variation in the delta weights which are produced by each calculation function in each processing unit. What is needed therefore is a way to combine and distribute the delta weights across the processing units after each iteration of batched training data. This is shown diagrammatically in FIG. 1 where a combinational function 118 receives the delta weights from each processing unit and performs a mathematical function which reduces the delta weights, such as an averaging function. The output of the combinatorial function 118 is then fed back to combining circuitry 120a, 120b and 120c within each processing unit respectively. A new set of weights is thus produced as a combination of the original weights and the combined output from the combinatorial function 118, and the new weights 116a, 116b, 116c are stored back into local memory. Then, the next batch of training data is supplied to each processing unit and the process repeats multiple times. It is evident that if the starting weights of the processing units are the same, then after each iteration they will be reset again to the same, new values. It can readily be seen that the above is an example of where the Allreduce function is particularly useful. The delta weights are supplied to the combinatorial function 118a where they are reduced, and they are then supplied back to each of the processing units in their reduced form, where they can be combined with the original weights.

FIG. 1A is a schematic diagram to illustrate how an Allreduce collective might be implemented in a line connected topology of six processing nodes $N_0 \ldots N_5$. These processing nodes may correspond to the processing units of FIG. 1 in which the combinational function is distributed between the nodes so that there is no longer a combining node as in FIG. 1. The processing nodes are shown connected in a line configuration where each processing node is connected to its neighbour by a "forwards" links $L_F$ and a "backwards" link $L_B$. As shown in the diagram, and as the directional phrases imply, the forward links connect processing nodes from the left to right in FIG. 1A, and the backwards links connect processing nodes from the right to left in FIG. 1A. Each processing node has a processing capability designated 200, and a storage capability designated 202. The processing capability and storage capability can be implemented in any of a very large number of ways. In one particular manifestation, the processing node may comprise multiple tiles, each individual tile having its own processing capability and associated memory capability. Each processing node also has one or more link interface which enables it to be connected to its neighbouring node via the links $L_F/L_B$.

To understand the implementation of the Allreduce collective, assume that the first node N0 has generated a "partial" vector labelled Δ0. The "partial" may be a data structure comprising an array, such as a vector or tensor, of delta weights. A partial vector is an array of partials each corresponding to a computation on the processing nodes. Each "partial" may be a set of delta weights. This is stored in the storage capability 202 ready to be exchanged in an Allreduce collective. In a simple "streaming" line Allreduce algorithm, the forward links are used for "reduce" and the backward links are used for "broadcast". The algorithm starts with the processing node at one end (the left hand node in FIG. 1A) sending its partial Δ0 to its adjacent node $N_1$. At this node, the incoming partial (Δ0 in this case) is reduced with the corresponding partial which was generated by the computing capability 200 at the processing node $N_1$, Δ1. The result of this reduction (shown as an ADD function in FIG. 1A) is then sent from processing node $N_1$ to the next connected node $N_2$. As mentioned further herein, the ADD function could be replaced by any combinatorial function which could be used to reduce the partials. The process occurs at each processing node, until at the final processing node, denoted $N_5$ in FIG. 1A, the reduction of the partials is complete. At this point, the reduction (summation Δ) is sent back to each processing node via the backward links $L_B$. It is received at each node, stored at that node in the memory capability and then also transmitted to the next node. In this way, each processing node ends up with the reduced result.

FIG. 1B shows a timing diagram of the reduce and broadcast phases. Note that a processing node cannot send a reduced result to the next node until it has received the incoming data from the previous node. Thus, there is an inherent latency marked Δ for each outgoing transmission on the forward links.

Furthermore, the backward links are not utilised for broadcast until the fully reduced result has been obtained at the end node. However, if the partial vectors are large due to the pipelined effect, the lead data item of the result, being the reduction of the first partials from the partial vectors at each node, will return to the starting node well before that node has finished sending the data items of its partial, so there may be a substantial overlap of activity on all forward and backward links.

In a modification to this algorithm, which represents a small improvement, processing nodes at each end of the line can start to transmit their partials towards a central node, with the reduction being completed at the central nodes. In that case, the result is broadcast back to the end nodes. Note that in this scenario, there would be a reversal in the direction of movement, for example between nodes $N_2$ and $N_3$, and $N_3$ and $N_4$ on both the forward and backward links. If a line is closed into a ring (by connecting the final node $N_5$ to the first node $N_0$ on both the backward and forward links), a pipeline algorithm can serialise reduction and broadcast in the same direction, so that the two logical rings formed by the bi-directional links can each operate independently on half of the data. That is, each partial vector is split into two and a first half ΔA is reduced on the forward links (as in FIG. 1A), and broadcast on the connecting leg between $N_5$ and $N_0$. The other half of the vector ΔB is reduced on the backward links, and then broadcast on the connecting ring of the backward links such that each node receives a copy of the Allreduce result.

FIG. 1D illustrates the corresponding timing diagram for the forward and backward links.

A. The principles of the one-dimensional ring shown in FIGS. 1A and 1C can be extended to rings in two dimensions such as in a torus or toroid connected computer.

Using rings in two dimensions, an alternative approach is to implement Allreduce using a reduce scatter collective followed by an Allgather collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processor. This approach operates on the basis that there are multiple data values (fragments) to be handled in each step. In the reduce-scatter collective, each process starts with an initial partial vector. It is assumed that a reference here to a process is to a process carried out on a processing node. A partial vector can be divided into multiple elements or fragments. The corresponding elements of all processes are reduced and these reduced elements are then distributed across the processes. In the Allgather collective, every process receives all elements from all other processes. The reduce-scatter collective reduces all partials and stores each reduction on a respective node—see FIG. 2. The Allreduce collective operation can be implemented by performing a reduce-scatter collective followed by an Allgather collective operation.

As discussed in Jain's paper, torus interconnects are attractive interconnection architectures for distributed memory supercomputers. In the above discussion, collectives have been explained in the context of communication between processes. In a distributed super computer, processing nodes are interconnected, and each processing node may be responsible for one or more process in the context of collectives. A torus interconnect is a type of mesh interconnect with processing nodes arranged in an array of N dimensions, with each node connected to its nearest neighbours, and corresponding nodes on opposite edges of the array also connected. Bi-directional communication links exist between interconnected processing nodes.

The algorithms for implementing collectives which are discussed in the above-referenced paper authored by Jain and Sabharwal are applied on torus connected architectures. This allows the collectives to process different fragments of the vectors in rings in different dimensions at the same time, making the process bandwidth efficient. Indeed, Jain and Sabthawal present their techniques as optimal for an asymmetric torus, and it has been accepted in the field that this is the case.

An objective of the present disclosure is to present an improved computer and method for implementing an Allreduce function, particularly but not exclusively for use in processing functions in machine learning. While the topologies and configurations described herein are particularly effective for the efficient implementation of Allreduce, they may also be advantageously used for other machine learning collectives and other types of parallel programs.

While the topologies and configurations described herein are particularly effective for the efficient implementation of Allreduce, they may also be advantageously used for other machine learning collectives and other types of parallel programs.

SUMMARY

According to an aspect of the invention there is provided a computer comprising a plurality of interconnected processing nodes arranged in a configuration with multiple layers, arranged along an axis, comprising first and second endmost layers and at least one intermediate layer between the first and second endmost layers;

each layer comprising a plurality of processing nodes connected in a ring by an intralayer respective set of links between each pair of neighbouring processing nodes, the links in each set adapted to operate simultaneously;

wherein processing nodes in each layer are connected to respective corresponding nodes in each adjacent layer by an interlayer link, wherein each processing node in the first endmost layer is connected to a corresponding node in the second endmost layer;

the computer being programmed to transmit data around a plurality of embedded one-dimensional logical rings, each logical ring using all processing nodes of the computer in such a manner that the plurality of embedded one-dimensional logical rings operate simultaneously, each logical ring using all processing nodes of the computer;

wherein the computer is programmed to transmit the data with an asymmetric bandwidth utilisation.

In some embodiments the utilisation of intralayer link bandwidth is greater than the utilisation of bandwidth along the axis.

In some embodiments the embedded rings are isomorphic.

The computer can be utilised to implement the Allreduce collective in a manner as herein described.

In one embodiment, the set of intralayer links comprises two links, and the bandwidth utilisation is B/6 along the axis, and B/3 within each layer, where B is the total bandwidth of each processing node. Three rings may be embedded.

In another embodiment, the set of intralayer links comprises three links, and the bandwidth utilisation is 3B/8 within each layer and B/8 along the axis. Four rings may be embedded.

Data may pass along each ring through the processing nodes in each layer in an anticlockwise or clockwise direction. In some embodiments the data may pass through successive layers in the same direction. In other embodiments the data may pass through successive layers in opposite directions. Many variants are possible.

Each processing node may comprise memory configured to store an array of data items ready to be exchanged in a reduce scatter phase, wherein each data item is respectively positioned in the array with corresponding data items being respectively positioned at corresponding locations in the arrays of other processing nodes. The array may be a "partial" (a vector of partial results) or a "result" (a vector of fully reduced partials).

The processing nodes may each be programmed to transmit data items in a forwards direction to its adjacent processing node in each ring the reduce-scatter phase. The data items which may be transmitted in each step are termed a "fragment". A fragment is piece of the vector—as described herein, vectors are divided into fragments to make use of logical rings formed in the embedded rings.

Each array may represent at least part of a vector of partial deltas, each partial delta representing an adjustment to a value stored at each processing node. Each processing node may be programmed to generate the vector of partial deltas in a compute step. Each processing node may be programmed to divide its vector into sub arrays for respective utilisation of the embedded defined rings.

Each of the processing nodes may be programmed to deactivate any of its interlayer and intralayer links which are unused in a data transmission step.

Each processing node may be programmed to divide a respective partial vector of that node into fragments and to transmit the data in the form of successive fragments around each one-dimensional path.

The computer may be programmed to operate each path as a set of logical rings, wherein the successive fragments are transmitted around each logical ring in simultaneous transmission steps.

Each processing node may be configured to output a respective fragment on each of its set of intralayer, and its interlayer, links simultaneously.

Each processing node may be configured to reduce incoming fragments with respective corresponding locally stored fragments.

Each processing node may be configured to transmit fully reduced fragments on each of its links simultaneously in an Allgather phase of an Allreduce collective.

In some embodiments, some or all links are bi-directional, that is they can transmit data in both directions over the link, optionally at the same time.

Another aspect of the invention provides a method of generating a set of programs to be executed in parallel on a computer comprising a plurality of interconnected processing nodes arranged in a configuration with multiple layers, arranged along an axis, comprising first and second endmost layers and at least one intermediate layer between the first and second endmost layers;

each layer comprising a plurality of processing nodes connected in a ring by an intralayer respective set of links between each pair of neighbouring processing nodes, the links in each set adapted to operate simultaneously;

wherein processing nodes in each layer are connected to respective corresponding nodes in each adjacent layer by an interlayer link, wherein each processing node in the first endmost layer is connected to a corresponding node in the second endmost layer;

the method comprising:

generating at least one data transmission instruction for each program to define a data transmission stage in which data is transmitted from the processing node executing that program, wherein the data transmission instruction comprises a link identifier which defines an outgoing link on which data is to be transmitted in that data transmission stage; and determining the link identifiers in order to transmit data around a plurality of embedded one-dimensional logical rings, each logical ring using all processing nodes of the computer in such a manner that a plurality of embedded one-dimensional logical rings operate simultaneously, each logical ring using all processing nodes of the computer;

wherein the programs are generated to transmit the data with an asymmetric bandwidth utilisation.

In some embodiments, the utilisation of intralayer link bandwidth is greater than the utilisation of bandwidth along the axis.

In some embodiments each program comprises one or more instruction to deactivate any of its interlayer and intralayer links which are unused in a data transmission step.

In some embodiments each program comprises one or more instruction to divide a respective partial vector of the processing node on which that program is executed into fragments and to transmit the data in the form of successive fragments over the respectively defined link.

In some embodiments each program comprises one or more instruction to output a respective fragment on each of multiple links simultaneously.

In some embodiments each program comprises one or more instruction to reduce incoming fragments with respective corresponding locally stored fragments.

In some embodiments each program comprises one or more instruction to transmit fully reduced fragments on each of its links simultaneously in an Allgather phase of an Allreduce collective.

Another aspect of the invention provides a method of executing a set of programs in parallel on a computer comprising a plurality of interconnected processing nodes arranged in a configuration with multiple layers, arranged along an axis, comprising first and second endmost layers and at least one intermediate layer between the first and second endmost layers;

each layer comprising a plurality of processing nodes connected in a ring by an intralayer respective set of links between each pair of neighbouring processing nodes, the links in each set adapted to operate simultaneously;

wherein processing nodes in each layer are connected to respective corresponding nodes in each adjacent layer by an interlayer link, wherein each processing node in the first endmost layer is connected to a corresponding node in the second endmost layer;

the method comprising:

executing at least one data transmission instruction in each program to define a data transmission stage in which data is transmitted from the processing node executing that program, wherein the data transmission instruction comprises a link identifier which defines an outgoing link on which data is to be transmitted in that data transmission stage;

the link identifiers having been determined in order to transmit data around each of a plurality of embedded one dimensional logical rings formed by respective sets of processing nodes and links in such a manner that a plurality of embedded one-dimensional logical rings operate simultaneously, each logical ring using all processing nodes of the computer;

wherein the data is transmitted with an asymmetric bandwidth utilisation.

In some embodiments, the utilisation of intralayer link bandwidth is greater than the utilisation of bandwidth along the axis.

In some embodiments executing the programs operates each path as a set of logical rings, wherein successive fragments of a partial vector provided at each processing node are transmitted around each logical ring in simultaneous transmission steps.

BRIEF DESCRIPTION OF THE DRAWINGS

For a better understanding of the present invention to show how the same may be carried into effect, reference will now be made by way of example to the accompanying drawings.

FIGS. 3A and 3B illustrate a bucket based Allreduce algorithm.

FIG. 5C illustrates a 3D view, showing one alternative of three embedded rings; the other two rings are the same rotated 120° about the long axis.

FIG. 6A illustrates a 4×6 toroid with 3:1 bandwidth asymmetry FIG. 6B illustrates four isomorphic embedded rings which can circulate concurrently on the graph, each using bandwidth B/8 per link FIG. 6C illustrates a 3D view, showing one of four embedded rings; the other three rings are the same rotated 90° about the long axis.

DETAILED DESCRIPTION

Aspects of the present invention have been developed in the context of a multi-tile processor which is designed to act as an accelerator for machine learning workloads. The accelerator comprises a plurality of interconnected processing nodes. Each processing node may be a single multi-tile chip, a package of multiple chips, or a rack of multiple packages. The aim herein is to devise a machine which is highly efficient at deterministic (repeatable) computation. Processing nodes are interconnected in a manner which enable collectives, especially broadcast and Allreduce, to be efficiently implemented.

One particular application is to update models when training a neural network using distributed processing. In this context, distributed processing utilises multiple processing nodes which are in different physical entities, such as chips or packages or racks. That is the transmission of data between the processing nodes requires messages to be exchanged over physical links.

The challenges in developing a topology dedicated to machine learning differ from those in the general field of high performance computing (HPC) networks. HPC networks usually emphasise on demand asynchronous all-to-all personalised communication, so dynamic routing and bandwidth over provisioning are normal. Excess bandwidth may be provisioned in a HPC network with the aim of reducing latency rather than to provide bandwidth. Over provisioning of active communication links waste power which could contribute to compute performance. The most common type of link used in computing today draws power when it is active, whether or not it is being used to transmit data.

The present inventor has developed a machine topology which is particularly adapted to MI workloads, and addresses the following attributes of MI workloads. The present embodiments provide different structures in which R rings are embedded on an R×N toroid where R is the number of nodes in a layer, N is the number of layers, and each ring visits all nodes in a layer before moving to the next layer.

In MI workloads, inter chip communication is currently dominated by broadcast and Allreduce collectives. The broadcast collective can be implemented by a scatter collective followed by an Allgather collective, and the Allreduce collective can be implemented by a reduce-scatter collective followed by an Allgather collective. In this context, the term inter-chip denotes any communication between processing nodes which are connected via external communication links. As mentioned, these processing nodes may be chips, packages or racks.

Note that the communication links could be between chips on a printed circuit board, or between chips on different printed circuit boards.

It is possible to compile the workloads such that within an individual intelligence processing unit (IPU) machine, all-to-all communication is primarily inter-chip.

Figure 2:
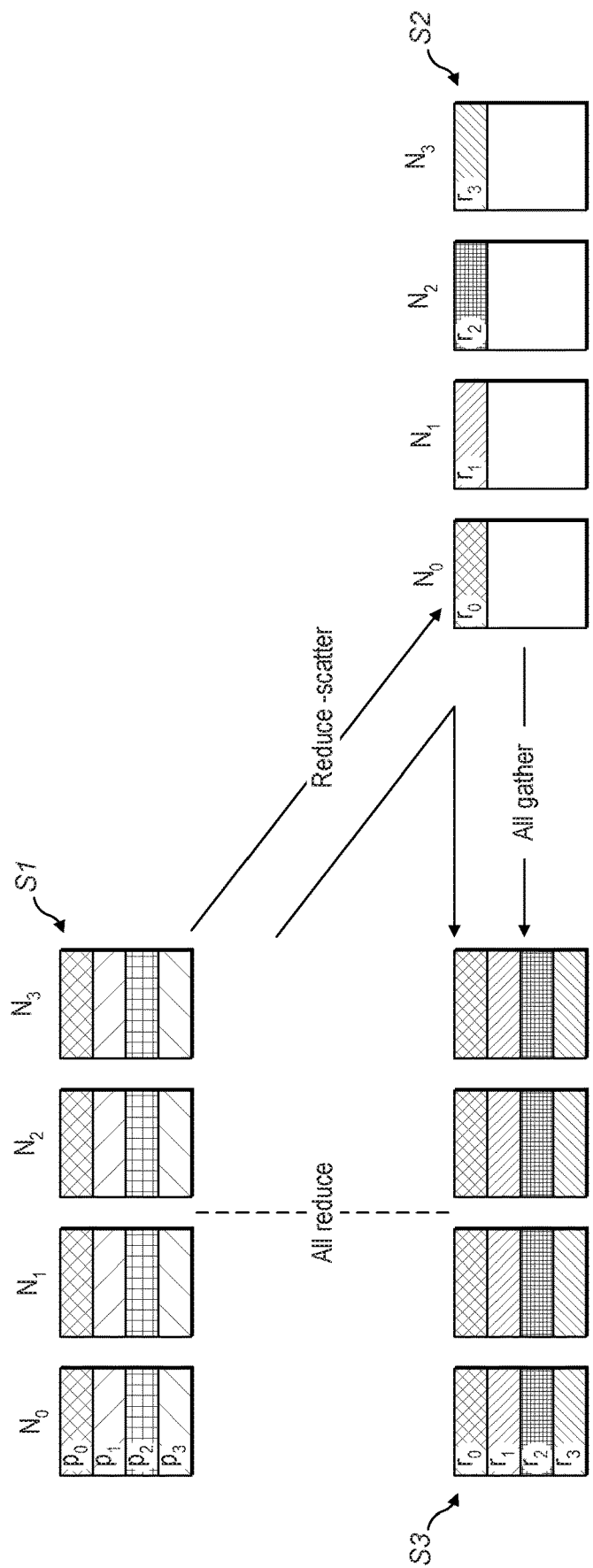
FIG. 2 is a schematic diagram illustrating implementation of an Allreduce function by a reduce-scatter step followed by Allgather step.

The Allreduce collective has been described above and is illustrated in FIG. 2. FIG. 2 shows a set of partial values or "partial" vector $P_0$, $P_1$, $P_2$, $P_3$ on each of four nodes in a starting state S1. In this context a node is a processing node in a network of processing nodes. Note that each node $N_0$, $N_1$, $N_2$, $N_3$ has four "corresponding" partials which are marked accordingly (large diamond grid, wide downward diagonal stripe, large square grid, wide upward diagonal stripe). That is, each partial has a position in its partial vector such that $P0(n)$ has the same position in its vector on node n as $P0(n+1)$ in its vector on node n+1. The suffix (n) is used to denote the node in which the partial resides—thus $P0(0)$ is the partial P0 on node N0. In a reduce-scatter pass, corresponding partials are reduced and the reduction provided to one of the nodes. For example, partials P0(0), P0(1), P0(2), P0(3) are reduced (to $r_0$) and placed onto node $N_0$. Similarly, partials P1(0), P1(1), P1(2) and P1(3) are reduced (to $r_1$) and placed onto node N. And so forth so that in an intermediate state S2, each node has one of the reductions $r_0$, $r_1$, $r_2$ and $r_3$. As explained, the reduction may be by any combinatorial function f ($Pi_0^3$)—which could include independent operators (e.g. max) or associative operators=P1(0) *P1(1)*P1(2)*P1(3). Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. $r_0$, is the same at all nodes, where $r_i$=f{($P_i(0)$, $P_i(1)$, $P_i(2)$ and $P_i(3)$)}. In machine learning, the set of partials P0, P1, P2, P3 is a vector. A vector of partials (e.g. updated weights) is produced on each pass of the model during training. The reduction $r_0$, $r_1$, $r_2$, $r_3$ on diamond grid, downward diagonal stripe, square grid, upward diagonal stripe each node in state S3 is the full reduction vector that is the vector of "results" or fully reduced partials. In the context of machine learning, each partial could be an updating delta for a parameter in the model. Alternatively (in an arrangement not described further herein) it could be an updated parameter.

Figure 3B:
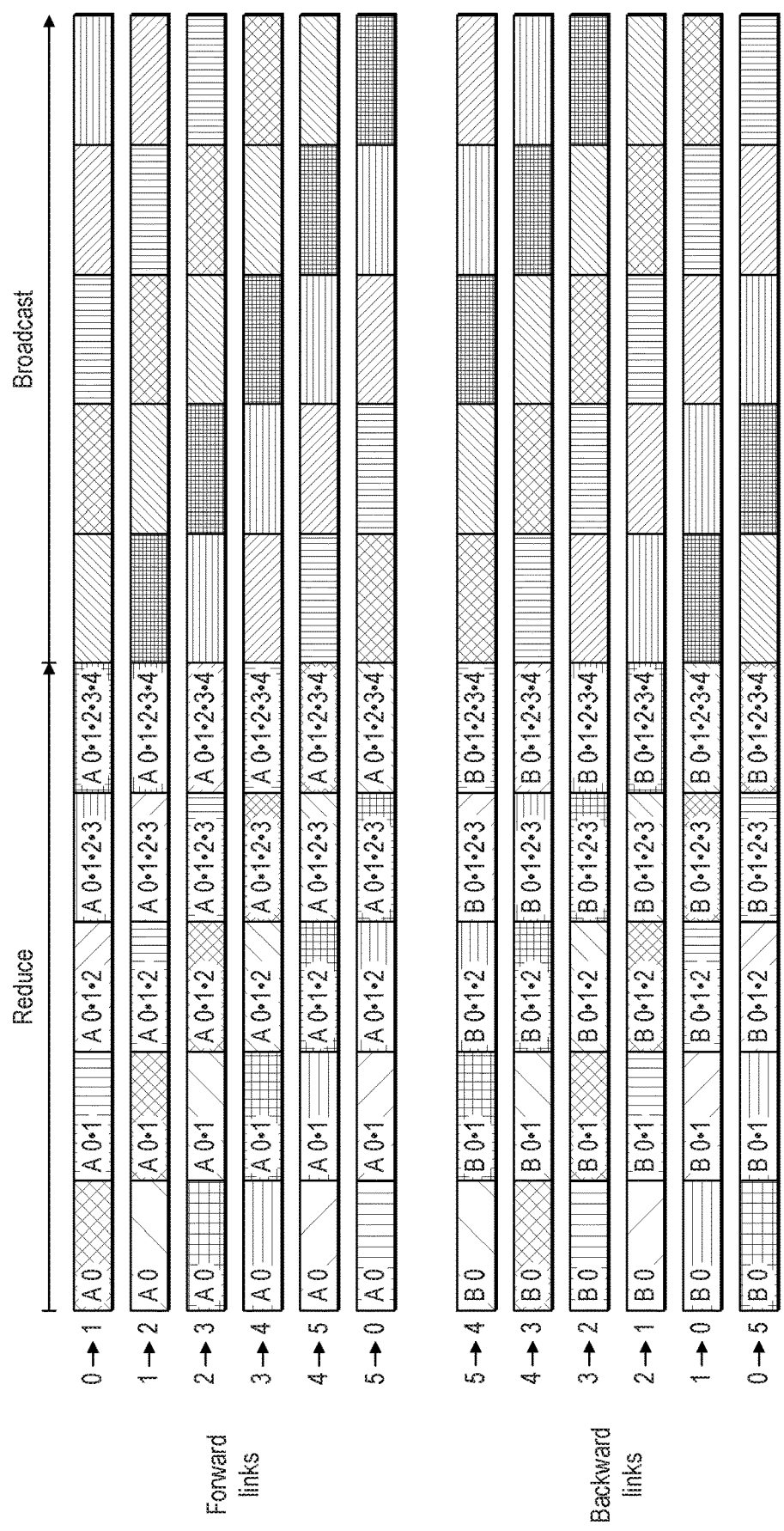

FIGS. 3A and 3B illustrate a bucket based algorithm for reduce-scatter/Allgather that assumes six "virtual rings. These are also termed "logical" rings herein. FIG. 3A is a schematic diagram illustrating the reduction of partials in multiple virtual rings. Each partial is split into six fragments. In FIG. 3A, the capital letters R, Y, G, B, P, L each denote a different fragment of a partial stored at each node, indicated by hatchings diamond grid, upward diagonal stripe, square grid, horizontal stripe, downward diagonal stripe, vertical stripe. The letters denote corresponding fragments which are to be reduced with each other, and define the "virtual" or "logical" ring for those fragments. Looking at FIG. 3A, the "R" fragments in each of the partials P0, P1, P2, P3 and P4 are reduced into a single fragment in the result vector ($R\Sigma A_0^5$). Similarly for the Y, G, B, P and L fragments.

FIG. 3B shows a timing diagram with time on the horizontal axis indicating the data exchanges and computations in each step of the Allreduce process. In FIGS. 3A and B, the Allreduce process is accomplished by a reduce-scatter phase followed by an Allgather phase. In FIG. 3B each of the fragments are denoted by different hatching as follows: R—diamond grid, Y—upward diagonal stripe, G—square grid, B—horizontal stripe, P—downward diagonal stripe, L—vertical stripe.

The notation in FIGS. 3A and 3B is as follow. The partials are each denoted P0, P1, P2, P3, P4, P5. At the start of the process, each partial is stored on a respective node N0, N1, N2, N3, N4, $N_5$. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3-N4-N0. RA1 denotes the R fragment at node N1, which is in the second position in its virtual ring. YA0 denotes the Y fragment at node N1. The "0" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 3A shows only the virtual rings on the forward links. FIG. 3B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the A0 fragments of each virtual ring will simultaneously be being transmitted. That is, the link between N1 and N2 is used to transmit YA0, the link between N2 and N3 is used to transmit GA0 et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all fragments are numbered, nor are all transmissions numbered in FIG. 3A. The full set of fragments and numbers are shown in FIG. 3B. This process carries on for five steps. After five steps, there is a reduction of all fragments on each node. At the end of the fifth step, this reduction is on the last node of each corresponding ring for that fragment. For example the R reduction is on node N5.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node N0. In the next step of the Allgather phase, the reduced fragments are transmitted again to their next adjacent node. Thus the fully reduced R fragment is now also at N2, the fully reduced Y fragment is now also at N3 and so on. In this way, each node ends up at the end of the Allgather phase with all fully reduced fragments R, Y, G, B, P, L of the partial vector.

Figure 1:
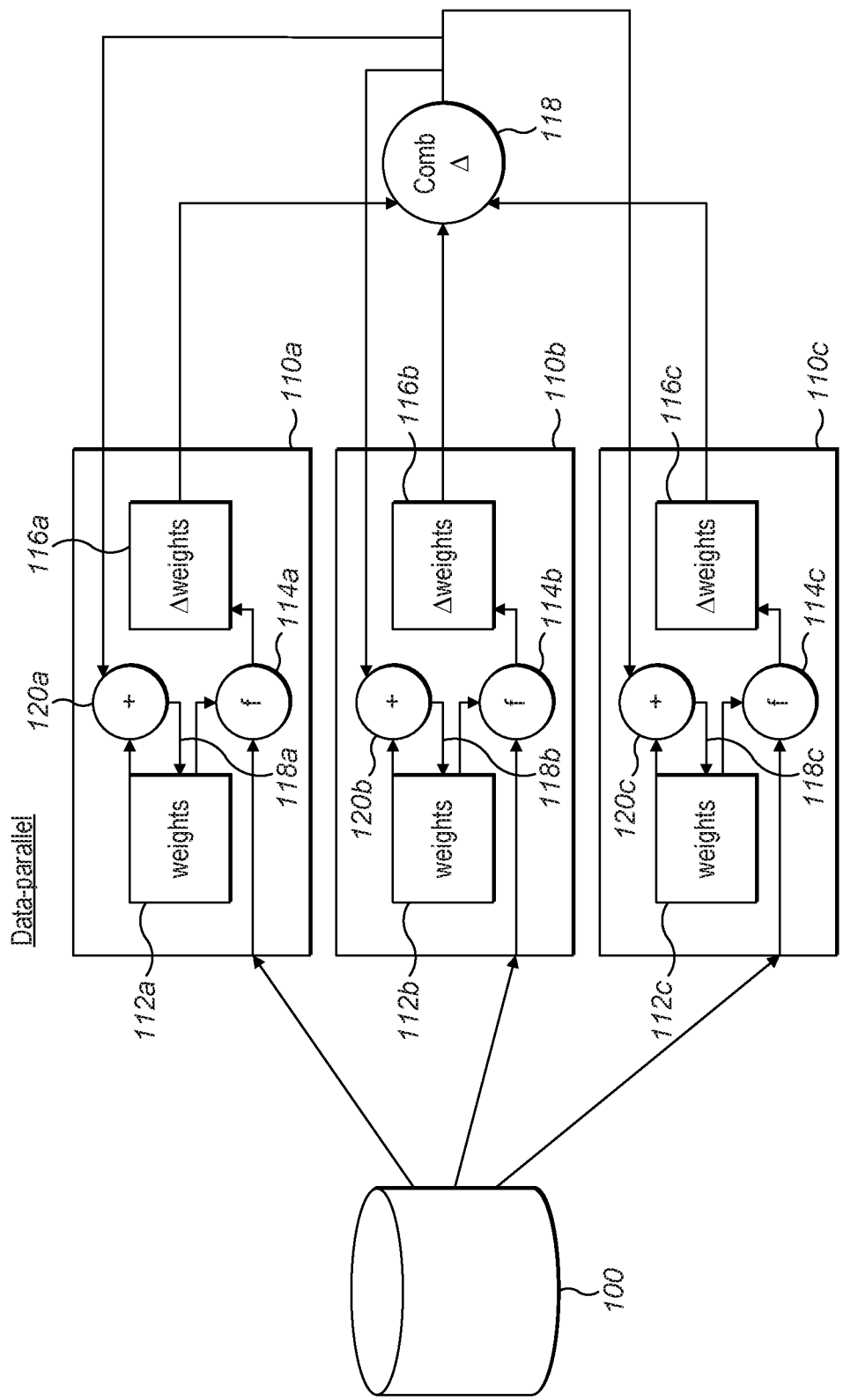
FIG. 1 is a schematic diagram illustrating distributed training in a neural net.
Figure 1A:
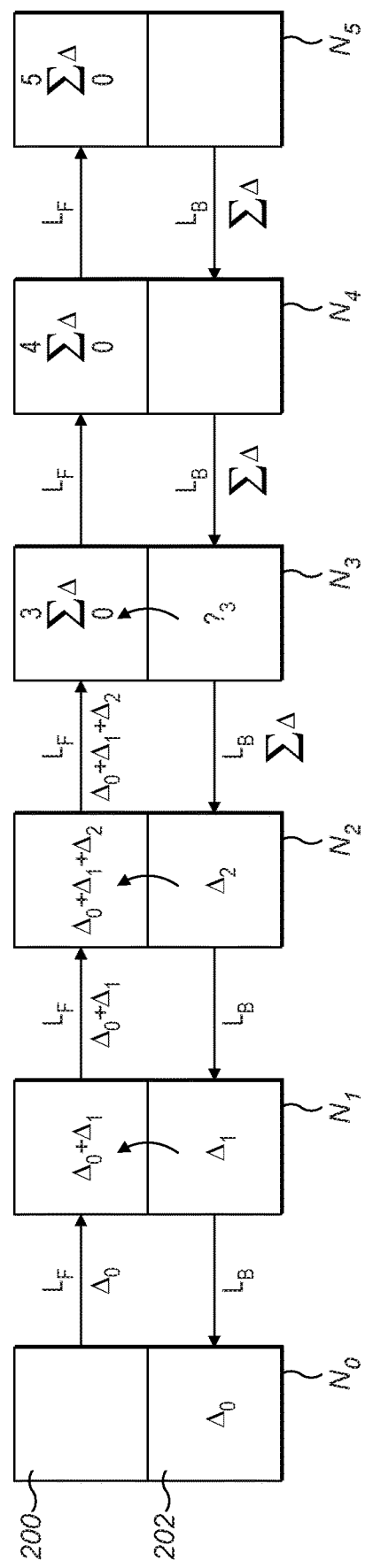
FIG. 1A is a schematic diagram showing a line of processing nodes for implementing a simple "streaming" line Allreduce algorithm.
Figure 1B:
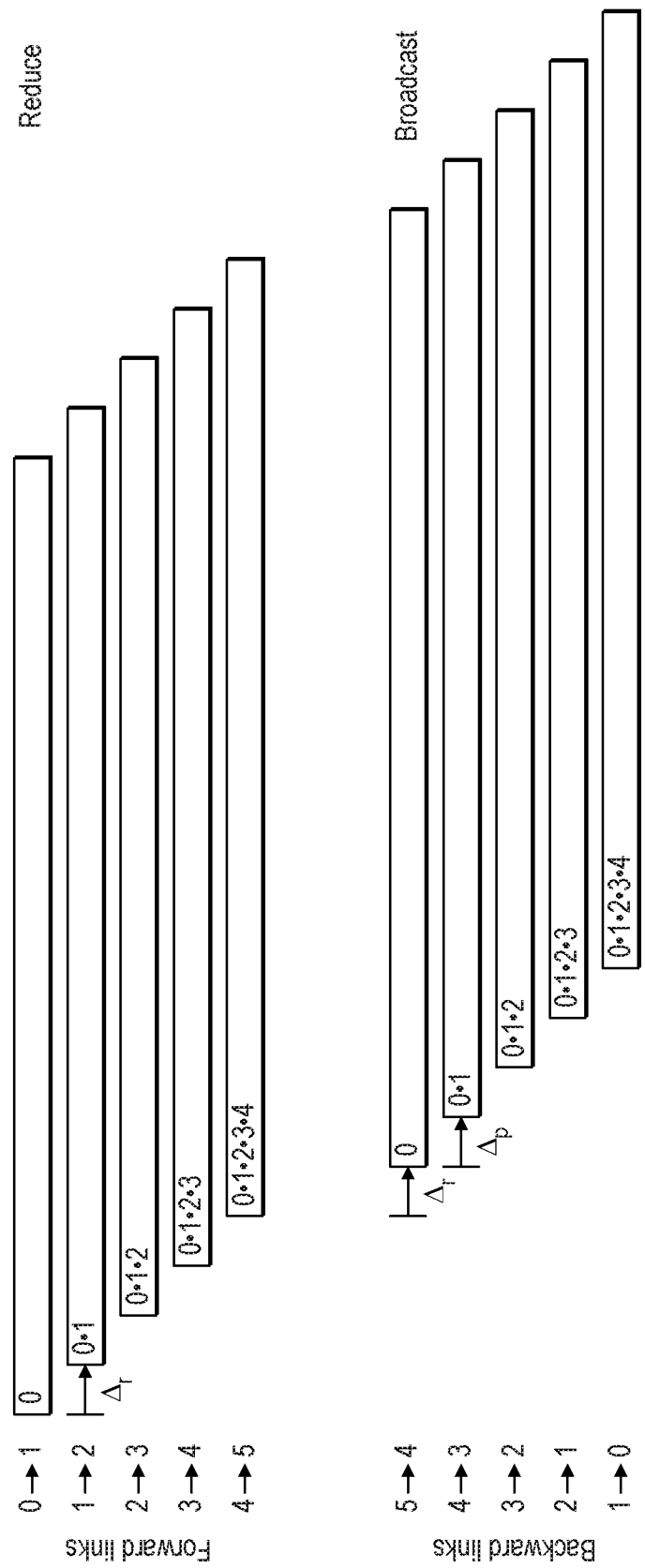
FIG. 1B is a timing diagram of a "streaming" line Allreduce algorithm.
Figure 1C:
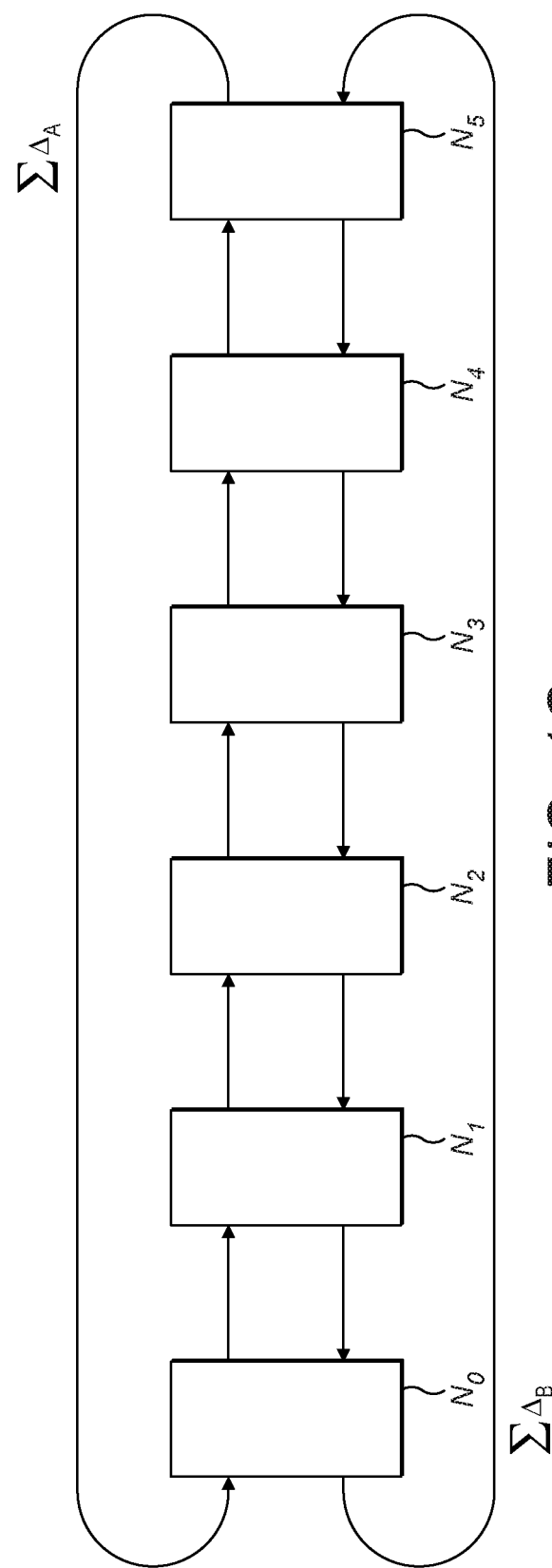
FIG. 1C is a schematic diagram of a line with the end nodes connected into a ring.
Figure 1D:
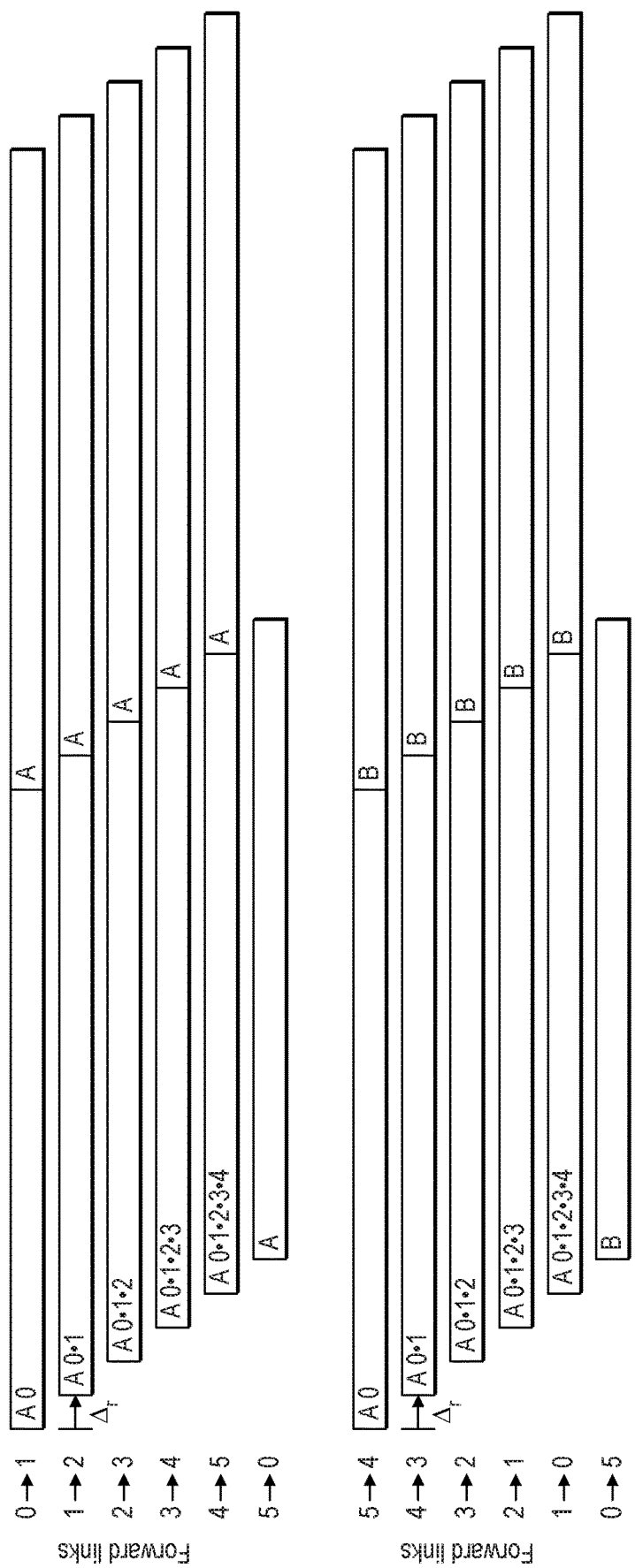
FIG. 1D is a timing diagram of a ring Allreduce algorithm.

Implementation of the algorithm is effective if the computation required for the reduction can be concealed behind the pipeline latency. Note that in forming suitable rings in a computer for implementation of Allreduce, a tour of the ring must visit each node in the ring only once. Therefore the natural ring formed by a line with bi-directional links (FIG. 1A) is not the most efficient ring.

There will now be described an improved topology for an interconnected network of processing nodes which permits an efficient exchange of partials and results between processing nodes to implement an Allreduce collective.

Figure 4:
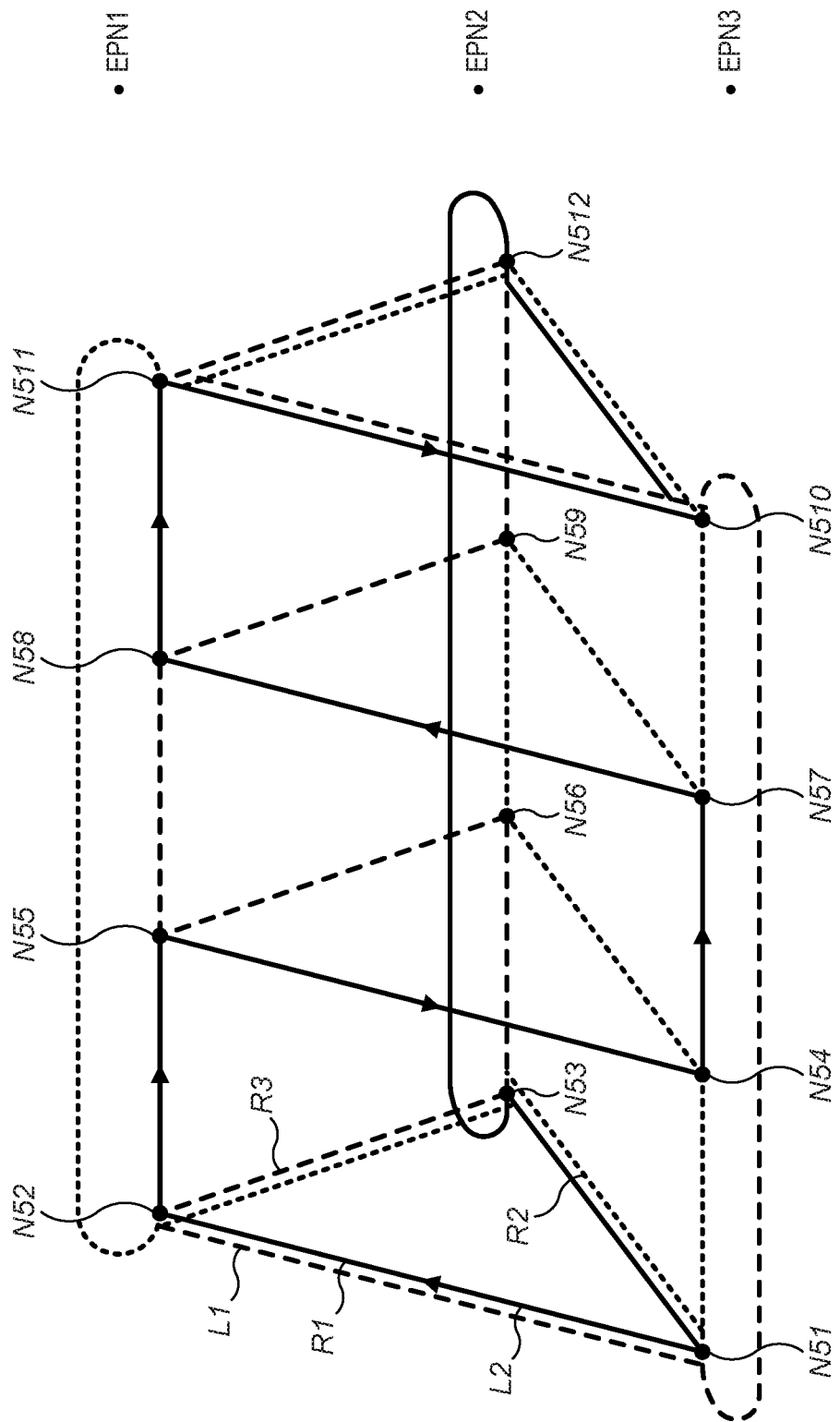
FIG. 4 is a schematic diagram of a 'triangular toroid' configuration of processing nodes in which three rings are embedded.
Figure 5D:
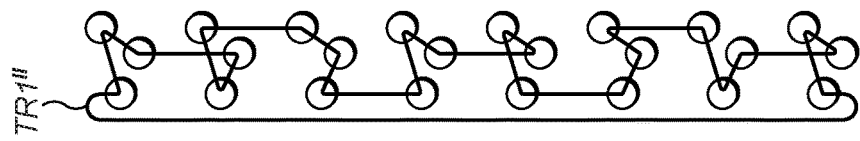
FIG. 5D illustrates a 3D view, showing another alternative of three embedded rings; the other two rings are the same rotated 120° about the long axis.
Figure 5C:
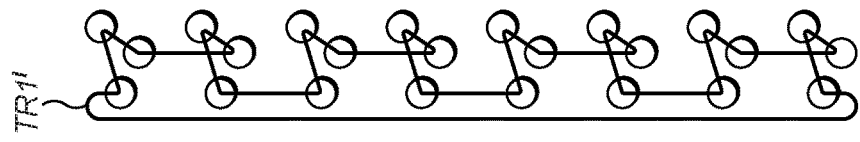
FIG. 5C illustrates a 3×8 toroid with 2:1 bandwidth asymmetry

According to another configuration of embedded one-dimensional rings, a configuration is provided with multiple stacked layers. One embodiment of such a configuration is shown in FIG. 4, which is a three-dimensional view of a triangular toroid. There is a physical connectivity and a logical connectivity which will both be described. According to the physical connectivity the configuration comprises multiple stacked layers—the stack shown from left to right in the FIG. 4. The orientation of the stacking is not relevant, although it is noted that in practical configurations where processing units may be arranged in server racks, stacking in a vertical configuration corresponding to the server racks can be useful. FIGS. 5A and 6A show such vertical stacks.

Each layer comprises three processing nodes which are shown in the left hand most layer in FIG. 4 as N51, N52 and N53. These processing nodes are connected in a ring wherein each processing node is connected to its adjacent processing node by two links L1, L2. These links may each be bi-directional. The right hand endmost layer of the stack is also connected together by two links between nodes. The central layers of the stack are however connected only with single links. Connectivity by a link here means that the links are active and able to transmit data. There may be other inactive connections between the processing nodes, which do not form part of the operation of the configuration.

The configuration is operated to provide three embedded one-dimensional rings which can or operate at the same time. FIG. 4 shows this schematically, with the rings labelled R1, R2 and R3. R1 is shown in a full dark line, R2 is shown as a dotted line and R3 is shown as a dashed line. Considering the configuration as a cylinder of triangular cross-section, each flat face of the cylinder incorporates a one-dimensional embedded ring. For example, the ring R1 is formed by nodes N51, N52 (in the endmost layer), a link between N52 and N55 (between the layers) a link between N55 and N54 (within the next layer), a link between N54 and N57 (between layers), a link between N57 and N58 (within the next layer), a link between N58 and N511 between the layers, a link between N511 and N510 (in the right hand endmost layer), a link between N510 and N512 and a return link between N512 and N53, and back to N51.

Corresponding embedded rings can be found in each of the other two phases. Thus, each ring is formed of a link within each layer connected to a link between layers, and so on until the ring is complete. The rings (or paths) are described in more detail below), with reference to FIG. 4.

In the first embedded path, node N51 is connected to node N53 along one side of the first endmost layer by the link between nodes N51 and N53. This is an intralayer link along one side of the first endmost layer. The path continues along a next side of the first endmost layer to node N52. The path then proceeds from node N52 to node N56 via an interlayer link. The path then proceeds from node N56 to N55 via another intralayer link on the same face of the configuration as nodes N52 and N56. The path extends down this face from node N55 to node N58 and then across the face along the intralayer link to node N57. The path proceeds from node N59 to node N511 along an interlayer link and then along an intralayer link from node N61 to node N512 from where it proceeds along an intralayer link from N512 to node N510 of the second end most layer. The intralayer links between nodes N511, N512 and N510 are sides of the second endmost layer. The path then proceeds along a return portion from node N510 to node N51 of the first end most layer. This path is shown by a small dash line in FIG. 5A.

A second embedded path can also be shown commencing from node N51 shown in a solid black line. This path has a first portion along the "bottom" face of the configuration shown in FIG. 4 extending from node N51 to node N53, from node N53 to node N55, from node N55 to node N54, from node N54 to N57, from node N57 to N58, from node N58 to N512 and from node N512 up to node N511. A return second portion of the path is provided by the interconnecting link between node N511 of the second endmost layer and N52 of the first endmost layer.

A third embedded path can be shown starting at node N53 and extending along intralayer link to node N52; the third embedded path is shown in large dash. The path then proceeds along the rear face of the configuration shown in FIG. 4 from node N52 to N51, N51 to N54, N54 to N56, node N56 to N59, from node N59 to N57, from node N57 to N510, from node N510 to node N511 and from node N511 to N512. The path has a return portion from node N512 to N53.

Note that each path has a first portion which uses each of the nodes in one face of the configuration only once, and two "legs" of each of the endmost layers. Each path then has a return portion which passes directly between endmost layers, without passing through any intermediate processing nodes.

The three embedded rings may operate simultaneously. If all of the links are capable of simultaneous bi-directional operation, six embedded rings may operate simultaneously.

The capacity of the computer may be extended by adding new layers of processing nodes. In order to do this, the interconnectivity of the processing nodes is altered. For example, consider the addition of an extra layer added on to the second endmost layer (the right-hand layer in FIG. 4). One of the links from node N511 is disconnected and is connected to a corresponding processing node in an additional layer, the processing node shown labelled EPN1 (extra processing node 1). Similarly, one of the links from each of node N512 and node N511 is disconnected from their currently connected node and are connected to corresponding extra processing nodes labelled EPN2 and EPN3 respectively. Nodes EPN1, EPN2 and EPN3 are then themselves connected in a ring with respective link structures as in the other layers of the configuration. Note that the connectivity of the remaining part of the configuration remains the same. Layers may be added in this way to either end of the configuration stack.

Note that the paths taken around each layer (set of three nodes) of the triangular cylinder configuration is such that an extended triangular prism of layers of three processing nodes could be partitioned into different lengths, such that each partition could operate in a self-contained manner. This could be done by deactivating links between the layers of separate partitions.

The interconnected network is a toroid configuration with asymmetric bandwidth allocation, in which a plurality of one dimensional rings or paths are embedded. The rings can be used simultaneously in a data exchange step.

In order to use this structure, the partial (or fragment) to be transmitted is split into two parts at each node, and each part is all reduced around one of the rings using the one-dimensional ring algorithm which has been described above the reference to FIGS. 3A and 3B.

Each node outputs $$\frac{n-1}{n}(v)$$

size of fragment, where N is the number of nodes, and V is the size of the data structure that is being reduce-scattered or Allgathered in a particular phase. At the beginning, V is the size of the partial vector. The number of fragments equals the number of nodes in the ring before each step around the ring. Note that in comparison with the structure described in the Jain paper, the rings pass through all nodes, and all links are used all of the time. It is assumed herein that each processing node can output its data on two links simultaneously, and can receive and process data simultaneously. Each ring is one-dimensional—it is a non-branched chain of processing nodes.

In some embodiments, the reference to operating as a ring refers to the implementation of a one-dimensional algorithm as described above to implement the Allreduce collective. In the structures described herein all embedded rings can operate simultaneously, enabling the division of a partial vector at each node into multiple parts for simultaneous processing over the plurality of rings in the structure.

When the return paths are provided by connections between corresponding processing nodes in the endmost layers, for example between node N51N and N510 in FIG. 4, a toroid structure is produced. Embodiments of the present invention provide a novel way of operating a computer network connected in a toroid configuration. The structure of FIG. 4 (has asymmetric bandwidth. Further embodiments provide toroids which are operated with asymmetric bandwidth utilisation. In the structure of FIG. 4 the asymmetry manifests itself in that there is more bandwidth between the layers. In the novel configurations described in the following the asymmetry manifests itself by providing more bandwidth utilisation in the layers.

FIG. 5A illustrates a 3×8 toroid. That is, each layer of processing nodes connected in a ring comprises three processing nodes, and there are eight layers. In FIG. 5A, the circles denote processing nodes and the lines in between denote the links connecting the processing nodes. Note that this is at a schematic level. FIG. 5A does not show the number of operative links between each pair of processing nodes. In fact, the number of operative links defines the bandwidth utilisation between the processing nodes. The computer network shown in FIG. 5A is configured with a 2 to 1 bandwidth asymmetry. That is, the bandwidth utilisation between processing nodes within a layer is B/3. The bandwidth utilisation between processing nodes of adjacent layers is B/6. Note that B is the maximum bandwidth utilisation. FIG. 5A shows the connectivity of the structure showing allocation of total node bandwidth B to the links. This bandwidth allocation can be seen more clearly from FIG. 5B.

Figure 5B:
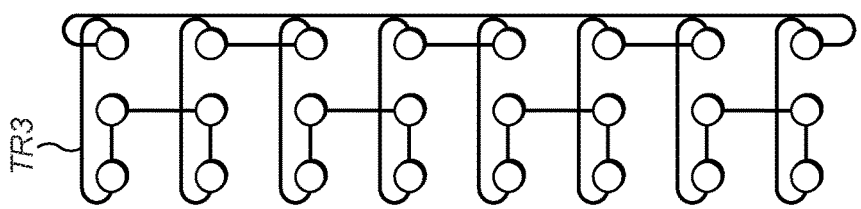
FIG. 5B illustrates three isomorphic embedded rings which can circulate concurrently on the graph, each using B/6 per link
Figure 5B:
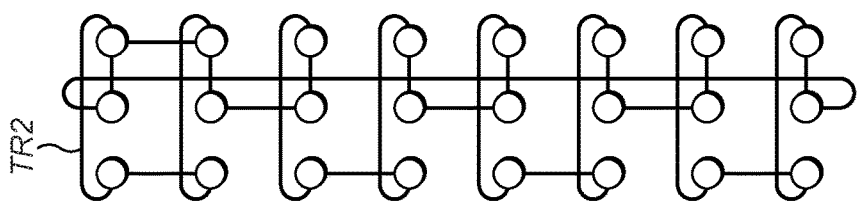
Figure 5B:
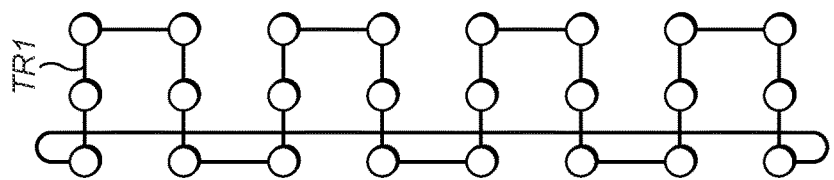
Figure 5A:
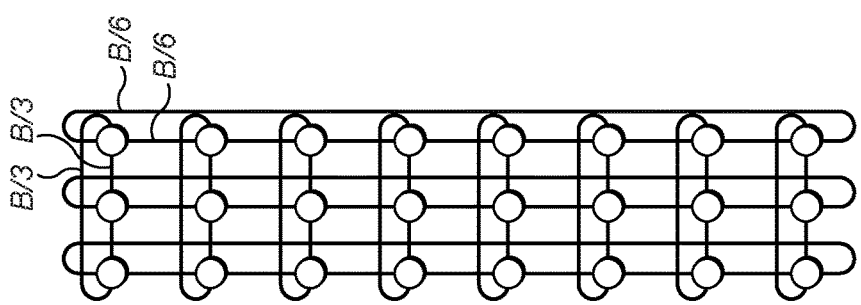
FIG. 5A illustrates an example in which processing units may be arranged in server racks, stacking in a vertical configuration corresponding to the server racks.

FIG. 5B shows each of three isomorphic embedded rings which can circulate concurrently on the structure, each using a bandwidth utilisation of B/6 per link. The rings are labelled TR1, TR2, TR3 respectively. The bandwidth utilisation can be seen by studying the three isomorphic embedded rings. For example, consider in rings TR1 and TR2 the end most layer of three processing nodes at the top of the figure. Both of the rings are using links between the two right hand most processing nodes. Thus, the bandwidth utilisation between these processing nodes is doubled due to the use of these two links. Similarly, the two left hand most processing nodes use two links in the rings TR1, TR3. However, in the axis of the structure down the page, only one downward link is used in each ring between processing nodes. The selection of links by each processing node to transmit data is determined by a compiler, as explained later. The compiler generates node level programs each of which define link identifiers to use in data exchange steps.

Different rings can be programmed in this way. For example, the direction which the data travels round the processing nodes of each layer may be clockwise or anticlockwise. Note that each node in the layer is visited before moving to the next layer. However, the direction in which the nodes may be visited can be clockwise or anticlockwise.

FIG. 5C is a three-dimensional view showing one of three embedded rings according to one possible ring structure. The other two rings are the same rotated 120° about the long axis. As mentioned, there are several equivalent routes to each ring. FIG. 5D illustrates one other alternative. In the ring of FIG. 5D, the ring travels clockwise around the processing nodes of each layer before moving onto the next layer. In the embodiment of FIG. 5C, the ring travels alternatively clockwise and anticlockwise on respective alternate layers. Other variations are possible using this structure.

FIG. 6A illustrates a 4×6 toroid structure. That is, each layer of the structure comprises four processing nodes connected in a ring, and there are six layers. Corresponding processing nodes in the endmost layers are connected together to form a toroid. FIG. 6A illustrates connectivity of the structure showing allocation of total node bandwidth B to the links. In this case, the bandwidth utilisation between processing notes in each layer is 3B/8. The bandwidth between processing nodes of adjacent layers is B/8. Note in this context that the bandwidth utilisation of the return path between the endmost layers is also B/8. The bandwidth utilisation is determined by the provision of links between the processing nodes. There are three operative links between adjacent processing nodes in each layer. There is one operative link between processing nodes in adjacent layers.

FIG. 6B shows the bandwidth utilisation in more detail by illustrating four isomorphic embedded rings which can circulate concurrently on the structure, each having a bandwidth utilisation of B/8 per link. For example, it can be seen that the rings BR1, BR2 and BR3 each use a link between the right hand most processing nodes in the top layer. Similarly, rings BR1, BR2 and BR4 use links between the middle two processing nodes of the top layer. Conversely, only a single link is utilised in each ring to connect between adjacent layers.

FIG. 6C is a three-dimensional view showing one of four embedded rings. The other three rings are the same rotated 90° about the long axis of the structure. Note that the ring visits each processing node in a layer before moving to the next layer. As with the structure illustrated in FIGS. 5A to 5D, different kinds of rings may be embedded, for example by passing around each layer in respectively different directions (anticlockwise or clockwise).

As with the structure of FIGS. 5A to 5D, the bandwidth utilisation is programmed using a compiler.

In the above embodiments, the fragment size is independent of the bandwidth on each link. Fragment size depends only on the number of nodes in the embedded ring (if there are n nodes then the optimal ring Allreduce algorithm uses fragments of size 1/n of the full vector, as discussed earlier). The bandwidth allocation shown is the fraction of total node bandwidth (in and out of the node simultaneously, in the case where all rings are bidirectional) which must be allocated to that link in order for the circulation of data on all the embedded rings to simultaneously use all the available bandwidth through all the nodes and links.

The bandwidth asymmetry refers to this allocation of bandwidth being different in the two dimensions of wired connectivity: the planes of the layers and the 'long axis' along which the layers are oriented (stacked). It is noted for completeness that the rings have only one dimension, but the structures all have two dimensions, when considering the data transmission paths.

Each node is capable of implementing a processing or compute function. Each node could be implemented as a single processor. It is more likely, however, that each node will be implemented as a single chip or package of chips, wherein each chip comprises multiple processors. There are many possible different manifestations of each individual node. In one example, a node may be constituted by an intelligence processing unit of the type described in British applications with publication numbers GB2569843; GB2569430; GB2569275, the contents of which are herein incorporated by reference. However, the techniques described herein may be used on any type of processor constituting the nodes. What is outlined herein is a method of exchanging data in an efficient manner to implement a particular exchange pattern which is useful in machine learning models. Furthermore, the links could be manifest in any suitable way. It is advantageous that they are bi-directional and preferable that they can operate in both directions at once, although this is not an essential requirement. One particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

It is possible that the links could be dynamically deactivated to consume effectively no power while not in use. However, the activation time and non-deterministic nature of machine learning applications generally render dynamic activation during program execution as problematic. As a consequence, the present inventor has determined that it may be better to make use of the fact that the chip to chip link power consumption is essentially constant for any particular configuration, and that therefore the best optimisation is to maximise the use of the physical links by maintaining chip to chip traffic concurrent with IPU activity as far as is possible.

SERDES PHYs are full duplex (that is a 16 Gbit per second PHY supports 16 Gbits per second in each direction simultaneously), so full link bandwidth utilisation implies balanced bi-directional traffic. Moreover, note that there is significant advantage in using direct chip to chip communication as compared with indirect communication such as via switches. Direct chip to chip communication is much more power efficient than switched communication.

Another factor to be taken into consideration is the bandwidth requirement between nodes. An aim is to have sufficient bandwidth to conceal inter node communication behind the computations carried out at each node for distributed machine learning.

When optimising a machine architecture for machine learning, the Allreduce collective may be used as a yardstick for the required bandwidth. An example of the Allreduce collective has been given above in the handling of parameter updating for model averaging. Other examples include gradient averaging and computing norms.

As one example, the Allreduce requirements of a residual learning network may be considered. A residual learning network is a class of deep convolutional neural network. In a deep convolutional neural network, multiple layers are utilised to learn respective features within each layer. In residual learning, residuals may be learnt instead of features. A particular residual learning network known as ResNet implements direct connections between different layers of the network. It has been demonstrated that training such residual networks may be easier in some contexts than conventional deep convolutional neural networks.

ResNet 50 is a 50 layer residual network. ResNet 50 has 25 M weights so Allreduce of all weight gradients in single position floating point format F16 involves partials of 50 megabytes. It is assumed for the sake of exemplifying the bandwidth requirement that one full Allreduce is required per full batch. This is likely to be (but does not need to be) an Allreduce of gradients. To achieve this, each node must output 100 megabits per all reduce. ResNet 50 requires 250 gigaflops per image for training. If the sub-batch size per processing node is 16 images, each processor executes 400 gigaflops for each Allreduce collective. If a processor achieves 100 teraflops per second, it requires around 25 gigabits per second between all links to sustain concurrency of compute with Allreduce communication. With a sub-batch per processor of 8 images, the required bandwidth nominally doubles, mitigated in part by lower achievable teraflops per second to process the smaller batch.

Implementation of an Allreduce collective between p processors, each starting with a partial of size m megabytes (equal to the reduction size) requires that at least 2 m.(p−1) megabytes are sent over links. So the asymptotic minimum reduction time is 2 m.(p−1).(p−1) over (p.1) if each processor has 1 links it can send over simultaneously.

The above described concepts and techniques can be utilised in several different exemplifications.

In one exemplification a fixed configuration is provided for use as a computer. In this exemplification, processing nodes are interconnected as described and illustrated in the various embodiments discussed above. In such arrangements, only essential intralayer and interlayer links are put in place between the processing nodes.

A fixed configuration may be constructed from a precise number of processing nodes for that configuration. Alternatively, it may be provided by partitioning it from a larger structure. That is, there may be provided a set of processing nodes which constitute a multiface prism with a set of stacked layers. The processing nodes in each stacked layer may have an interlayer link to a corresponding processing node in an adjacent stacked layer and an intralayer link between neighbouring processing nodes in the layer.

A fixed configuration of a desired number of stacked layers may be provided by disconnecting each interlayer link in a designated stacked layer of the origin set of stacked layers and connecting it to a neighbouring processing node in the designated stacked layer to provide an intralayer link. In this way, a designated stacked layer of the origin set of stacked layers may be caused to form one of the first and second endmost layers of a structure. Note that an origin set of layers may in this way be partitioned into more than one fixed configuration structure.

The interlayer and intralayer links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. Note that the concepts and techniques described herein are particularly useful in that context, because they make maximise use of links which have been pre soldered between chips on a printed circuit board.

The concepts and techniques described herein are particularly useful because they enable optimum use to be made of non-switchable links. A configuration may be built by connecting up the processing nodes as described herein using the fixed non switchable links between the nodes. In some manifestations, there is no need to provide additional links between the processing nodes if such links will not be utilised. For example, in intermediate layers in the configuration there are less links between processing nodes than in the endmost layers. Alternatively, links may be provided between processing nodes, but may be permanently deactivated in certain configurations.

In order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have two or three active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will readily be appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard discussed earlier. For example, a collective may be recalled from a library, such as the all reduced collective. In this way, the compiler has precompiled node level programs which control the links over which the partial vectors are transmitted (or respective fragments of the partial vectors are transmitted).

It will readily be apparent that other synchronisation protocols may be utilised.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A computer comprising a plurality of interconnected processing nodes arranged in a configuration with multiple layers, arranged along an axis, comprising first and second endmost layers and at least one intermediate layer between the first and second endmost layers;
   each layer comprising a plurality of processing nodes connected in a ring by an intralayer respective set of links between each pair of neighbouring processing nodes, the links in each set adapted to operate simultaneously;
   wherein processing nodes in each layer are connected to respective corresponding nodes in each adjacent layer by an interlayer link, wherein each processing node in the first endmost layer is connected to a corresponding node in the second endmost layer; and
   the computer being programmed to transmit data around a plurality of embedded one-dimensional logical rings, each logical ring using all processing nodes of the computer in such a manner that the plurality of embedded one-dimensional logical rings operate simultaneously;
   wherein the computer is programmed to transmit the data with an asymmetric bandwidth utilisation.

2. The computer according to claim 1, wherein the utilisation of intralayer link bandwidth is greater than the utilisation of bandwidth along the axis.

3. The computer according to claim 1, wherein the embedded rings are isomorphic.

4. The computer according to claim 1, wherein the set of intralayer links comprises two links, and the bandwidth utilisation is B/6 along the axis, and B/3 within each layer, where B is the total bandwidth of each processing node.

5. The computer according to claim 4, wherein three rings are embedded.

6. The computer according to claim 4, wherein the set of intralayer links comprises three links, and the bandwidth utilisation is 3B/8 within each layer and B/8 along the axis.

7. The computer according to claim 6, wherein four rings are embedded.

8. The computer according to claim 1, which is configured such that data passes along each ring through the processing nodes in each layer in one of an anticlockwise and clockwise direction.

9. The computer according to claim 8, which is configured such that the data passes through successive layers in the same direction.

10. The computer according to claim 8, which is configured such that the data passes through successive layers in opposite directions.

11. The computer according to claim 1, wherein each processing node comprises memory configured to store an array of data items ready to be exchanged in a reduce scatter phase, wherein each data item is respectively positioned in the array with corresponding data items being respectively positioned at corresponding locations in the arrays of other processing nodes.

12. The computer according to claim 1, wherein each processing node is programmed to transmit data items in a forwards direction to its adjacent processing node in each ring in a reduce-scatter phase.

13. The computer according to claim 1, wherein each processing node is programmed to generate a vector of partial deltas in a compute step and to divide its vector into sub arrays for respective utilisation of the embedded rings.

14. The computer according to claim 1, wherein each processing node is programmed to divide a respective partial vector of that node into fragments and to transmit the data in the form of successive fragments around each one-dimensional path.

15. The computer according to claim 14, which is configured to operate such that the successive fragments are transmitted around each logical ring in simultaneous transmission steps.

16. The computer according to claim 1, wherein each processing node is configured to reduce incoming fragments with respective corresponding locally stored fragments.

17. A method of generating a set of programs to be executed in parallel on a computer comprising a plurality of interconnected processing nodes arranged in a configuration with multiple layers, arranged along an axis, comprising first and second endmost layers and at least one intermediate layer between the first and second endmost layers;

each layer comprising a plurality of processing nodes connected in a ring by an intralayer respective set of links between each pair of neighbouring processing nodes, the links in each set adapted to operate simultaneously; and wherein processing nodes in each layer are connected to respective corresponding nodes in each adjacent layer by an interlayer link, wherein each processing node in the first endmost layer is connected to a corresponding node in the second endmost layer;

the method comprising:

generating at least one data transmission instruction for each program to define a data transmission stage in which data is transmitted from the processing node executing that program, wherein the data transmission instruction comprises a link identifier which defines an outgoing link on which data is to be transmitted in that data transmission stage; and determining the link identifiers in order to transmit data around a plurality of embedded one-dimensional logical rings, each logical ring using all processing nodes of the computer in such a manner that a plurality of embedded one-dimensional logical rings operate simultaneously;

wherein the programs are generated to transmit the data with an asymmetric bandwidth utilisation.

18. The method according to claim 17, wherein the utilisation of intralayer link bandwidth is greater than the utilisation of bandwidth along the axis.

19. A method of executing a set of programs in parallel on a computer comprising a plurality of interconnected processing nodes arranged in a configuration with multiple layers, arranged along an axis, comprising first and second endmost layers and at least one intermediate layer between the first and second endmost layers;

each layer comprising a plurality of processing nodes connected in a ring by an intralayer respective set of links between each pair of neighbouring processing nodes, the links in each set adapted to operate simultaneously;

wherein processing nodes in each layer are connected to respective corresponding nodes in each adjacent layer by an interlayer link, wherein each processing node in the first endmost layer is connected to a corresponding node in the second endmost layer;

the method comprising:

executing at least one data transmission instruction in each program to define a data transmission stage in which data is transmitted from the processing node executing that program, wherein the data transmission instruction comprises a link identifier which defines an outgoing link on which data is to be transmitted in that data transmission stage; and the link identifiers having been determined in order to transmit data around each of a plurality of embedded one dimensional logical rings formed by respective sets of processing nodes and links in such a manner that a plurality of embedded one-dimensional logical rings operate simultaneously, each logical ring using all processing nodes of the computer;

wherein the data is transmitted with an asymmetric bandwidth utilisation.

* * * * *